United States Patent
Li

(10) Patent No.: US 9,182,868 B2
(45) Date of Patent: Nov. 10, 2015

(54) ELECTRODE LOOP STRUCTURE OF TOUCH PANEL

(71) Applicant: Yu-Jie Li, Taichung (TW)

(72) Inventor: Yu-Jie Li, Taichung (TW)

(73) Assignee: MIRACLETOUCH TECHNOLOGY INC., Taichung (TW)

( * ) Notice: Subject to any disclaimer, the term of this patent is extended or adjusted under 35 U.S.C. 154(b) by 75 days.

(21) Appl. No.: 14/210,161

(22) Filed: Mar. 13, 2014

(65) Prior Publication Data

US 2014/0284078 A1    Sep. 25, 2014

(30) Foreign Application Priority Data

Mar. 21, 2013 (CN) .......................... 2013 1 0091983

(51) Int. Cl.
  *G06F 3/045* (2006.01)
(52) U.S. Cl.
  CPC ...... *G06F 3/045* (2013.01); *G06F 2203/04113* (2013.01)
(58) Field of Classification Search
  CPC ....................... G06F 3/045; G06F 2203/04113
  See application file for complete search history.

(56) References Cited

U.S. PATENT DOCUMENTS

2010/0156826 A1*  6/2010  Itaya et al. .................... 345/173
2012/0206398 A1*  8/2012  Wang et al. ................... 345/174

* cited by examiner

*Primary Examiner* — Ryan A Lubit
*Assistant Examiner* — Yaron Cohen

(57) ABSTRACT

An electrode loop structure of a touch panel mainly extends from I-shaped electrode elements serving as a base, and utilizes the annular conducting chain and gradient chain regularly cascaded together. A discontinuous resistor chain is disposed between the conducting chain and the gradient chain, wherein the conducting chain changes, by adjusting the cascaded length of and the gaps between the electrode elements, the conductor area to generate the trend of voltage drop, so that the conducting chain has the voltage regulating and compensating properties. Meanwhile, the gradient chain may also make the gradient chain have the voltage distributing uniformity by adjusting the lengths of and the gaps between the electrode elements, so that the electrode loop is effectively distributed around the electroconductive substrate to form the homogenized electric field effect, thereby satisfying the narrow-edge design requirement.

6 Claims, 8 Drawing Sheets

ELECTRODE LOOP STRUCTURE OF TOUCH PANEL

BACKGROUND OF THE INVENTION

1. Field of the Invention

The invention relates to the technical field of a touch panel.

2. Related Art

The manufacturing processes for a five-wire type resistive touch panel are extremely precise, and require the electric field uniformity that is higher than that of the typical four-wire type resistive touch panel. So, the resistance values of the circumferential silver wires must have the very high consistency, or otherwise the nonuniform voltage distribution of the workpiece surface tends to occur, and the coordinate position of the actual touch point is incorrectly judged or even the touch panel fails. The existing improvement is to try to establish the uniform equipotential electric field through the pattern layout of the resistive elements on the circumferential edges. For example, in U.S. Pat. No. 6,593,916, U.S. Patent Publication No. 2006/0119587 and Taiwan Patent Publication Nos. 201032098, 201032119 and 201122945, annular electrode loops constituted by different discontinuous electrodes on the periphery of the touch-sensing region are utilized to improve the potential "ripple" effect generated by the side-frame region.

SUMMARY OF THE INVENTION

It is therefore a main object of the invention to provide an electrode loop structure of a touch panel, in which discontinuous regular electrodes are cascaded into an annular electrode loop, so that the electrode loop is effectively distributed on the periphery of the substrate, and has the voltage regulating and compensating properties. Thus, a homogenized electric field effect is formed, and an extremely narrow-edge trace layout space can be provided to increase the visible range.

The invention mainly achieves the object and effect by providing the following technical means. The electrode loop structure of the touch panel includes an electroconductive substrate and an electroconductive film disposed on the electroconductive substrate. The electroconductive substrate has an upper surface coated with an electroconductive layer, and has a circumference printed with an annular electrode loop, wherein the electrode loop has a discontinuous resistor chain, a conducting chain formed outside the discontinuous resistor chain and a gradient chain formed inside the discontinuous resistor chain.

The conducting chain and the gradient chain extend from a plurality of I-shaped electrode elements and a plurality of horizontally linear control elements serving as a base, wherein the electrode element includes a long section, a short section and a middle conducting section connecting the long section to the short section.

Adjusting the cascaded length of and the gaps between the electrode elements can make the conducting chain have the voltage regulating and compensating properties and make the gradient chain have voltage distributing uniformity, so that the electrode loop is effectively distributed on the periphery of the substrate, thereby satisfying the narrow-edge design requirement.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
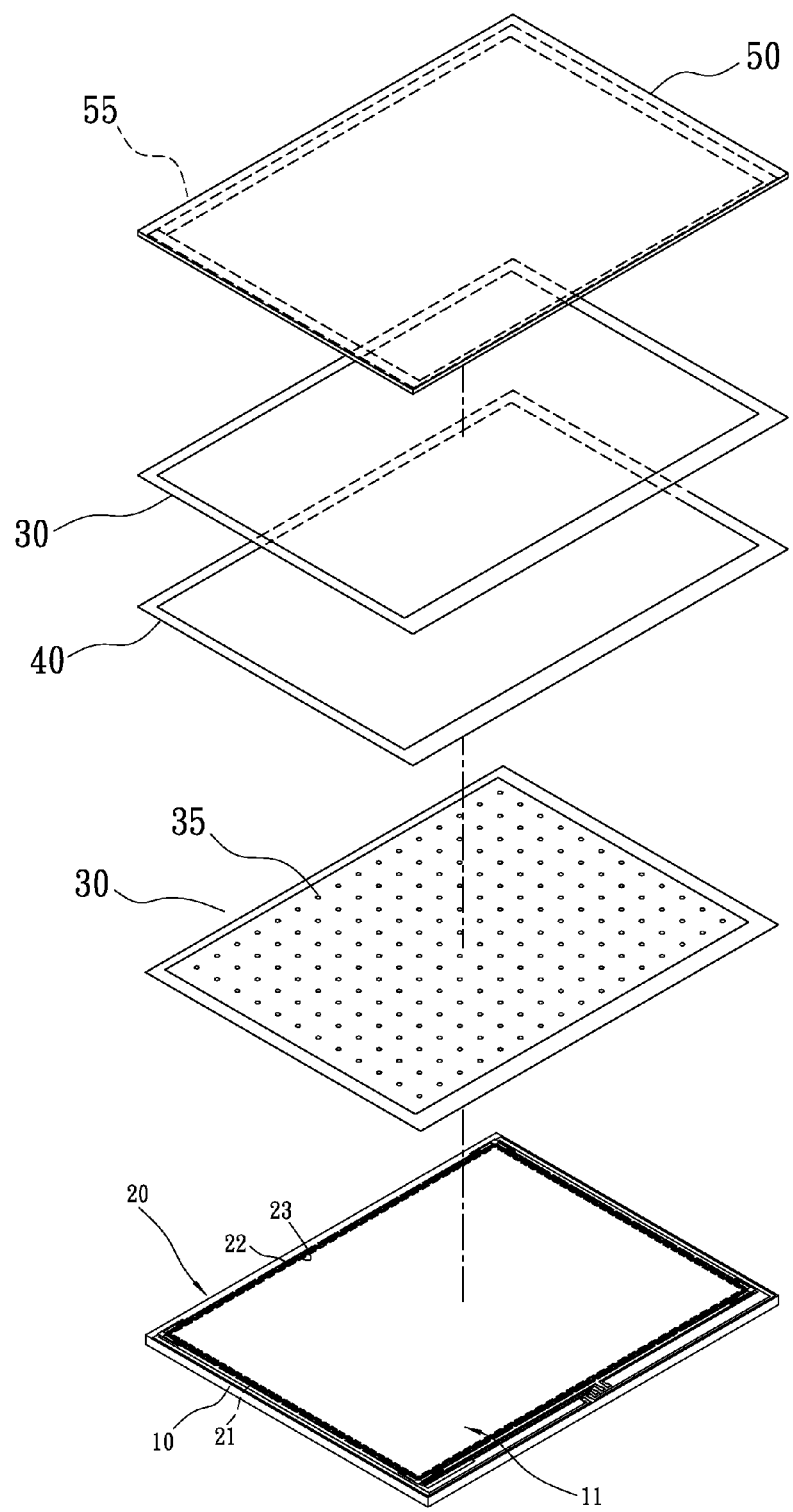
FIG. 1 is a schematic illustration showing the brief architecture of a touch panel of the invention.
Figure 2:
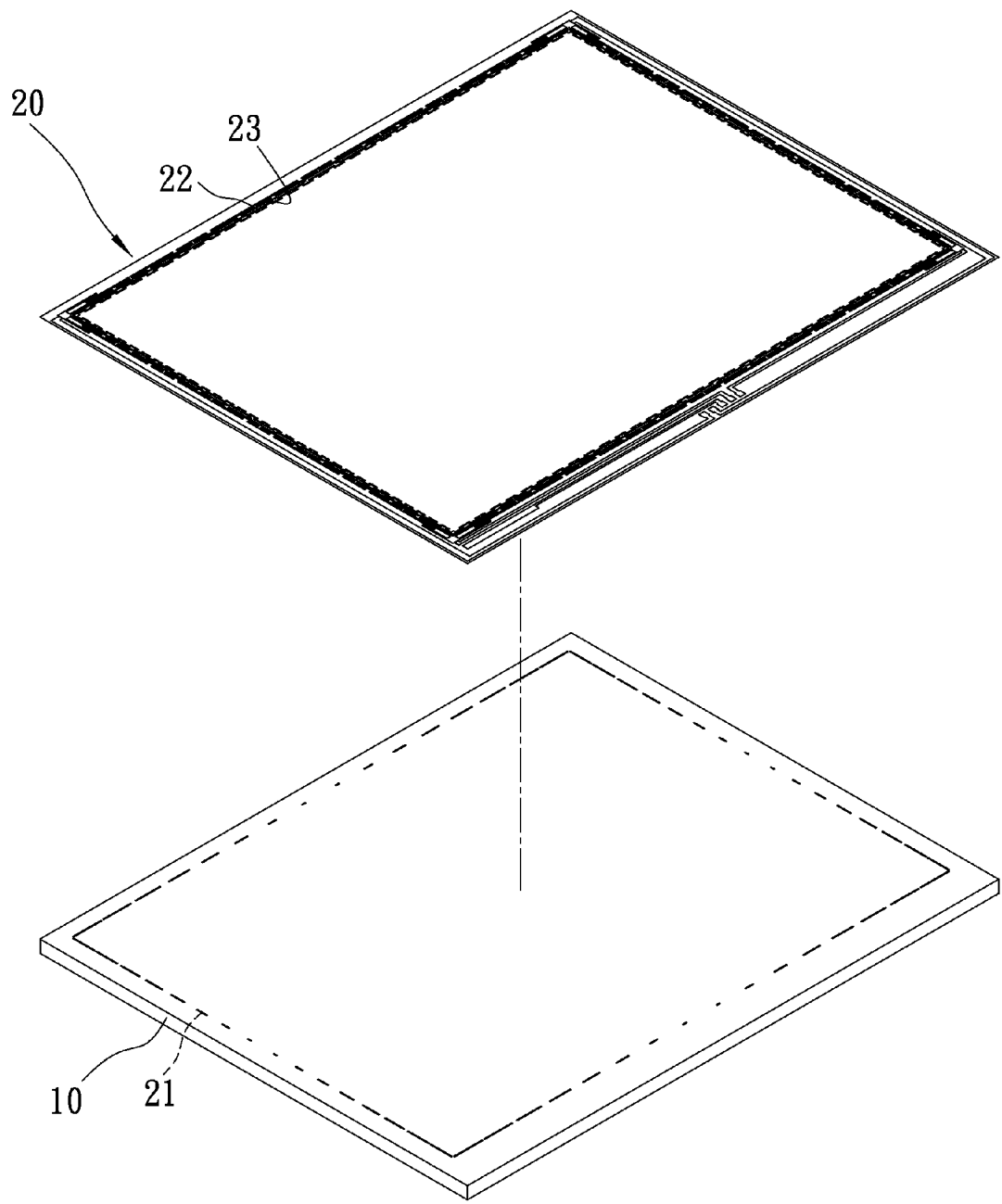
FIG. 2 is a schematic illustration showing the exterior of an electroconductive substrate in the touch panel of the invention.

The invention provides a five-wire resistive touch panel, as shown in FIGS. 1 and 2. The touch panel includes an electroconductive substrate (ITO glass) (10) and an electroconductive film (ITO film) (50). Each of opposite surfaces of the electroconductive substrate (10) and the electroconductive film (50) are coated with a transparent electroconductive layer. The upper surface of the electroconductive substrate (10) is printed with an annular electrode loop (20). The lower surface of the electroconductive film (50) is printed with a corresponding annular silver wire (55). Each of the regions corresponding to the electrode loop (20) and the silver wire (55) is printed with an annular insulating layer (30). Also, an insulating annular adhesive layer (40) is disposed between the two insulating layers (30), so that the electroconductive substrate (10) and the electroconductive film (50) may be adhered together to form an integral structure. Furthermore, the space surrounded by the insulating layers (30) is printed with a plurality of fine transparent insulators (35).

Figure 3:
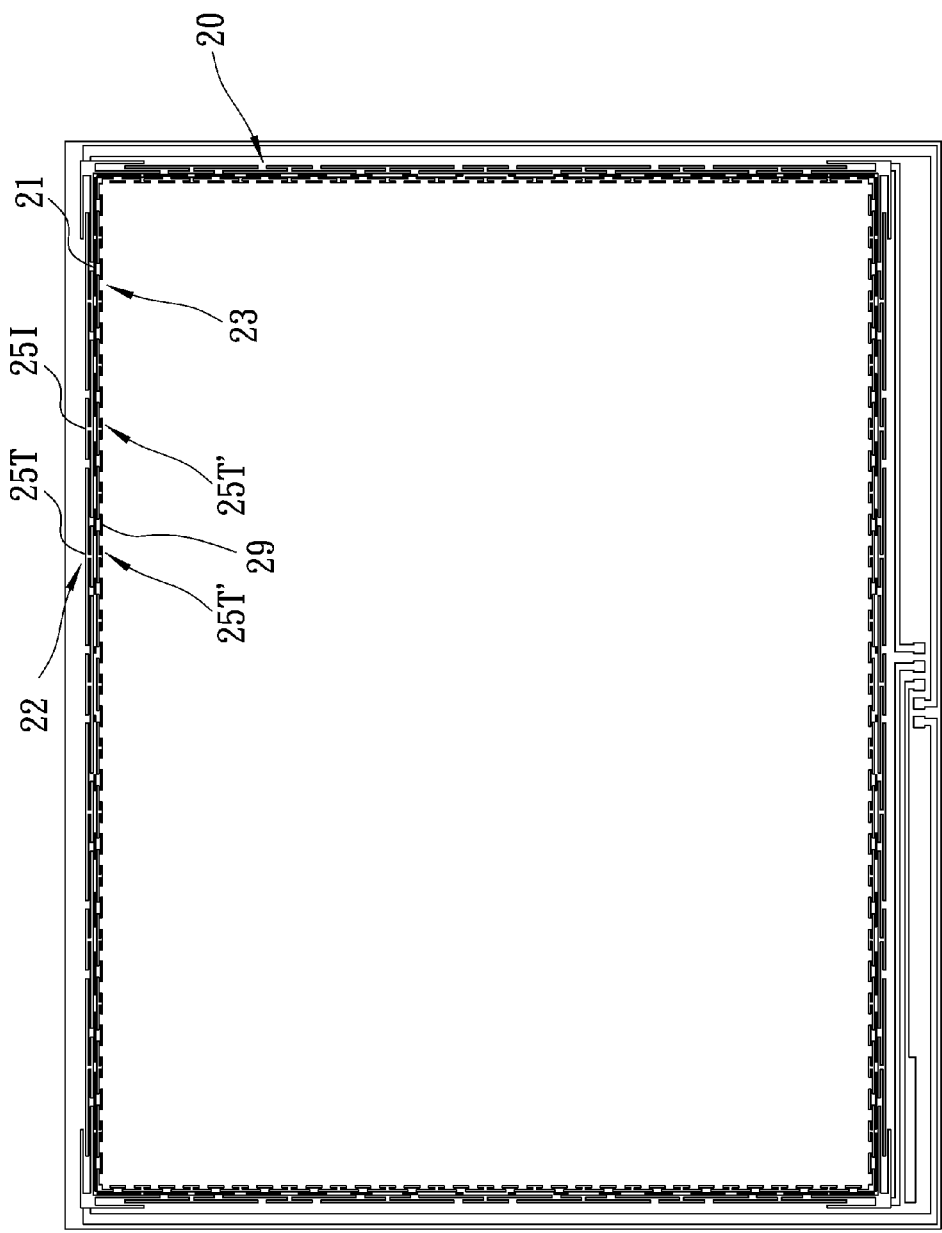
FIG. 3 is a schematic illustration showing a planar layout of an electrode loop structure of the touch panel according to a preferred embodiment of the invention.
Figure 4:
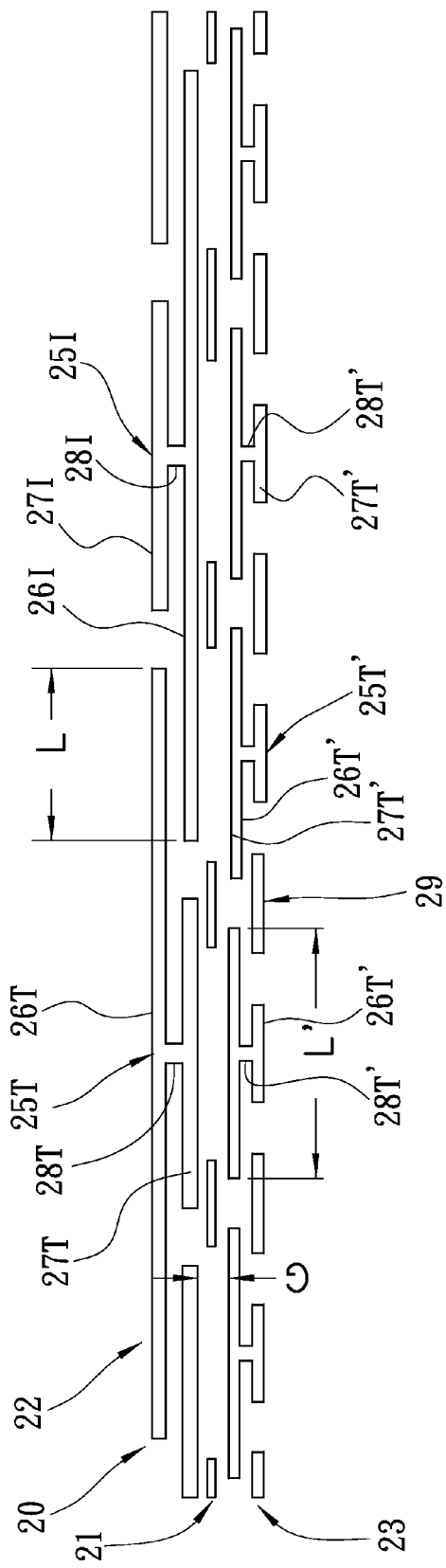
FIG. 4 is a schematic illustration showing a local layout of the electrode loop structure according to the preferred embodiment of the invention.
Figure 5:
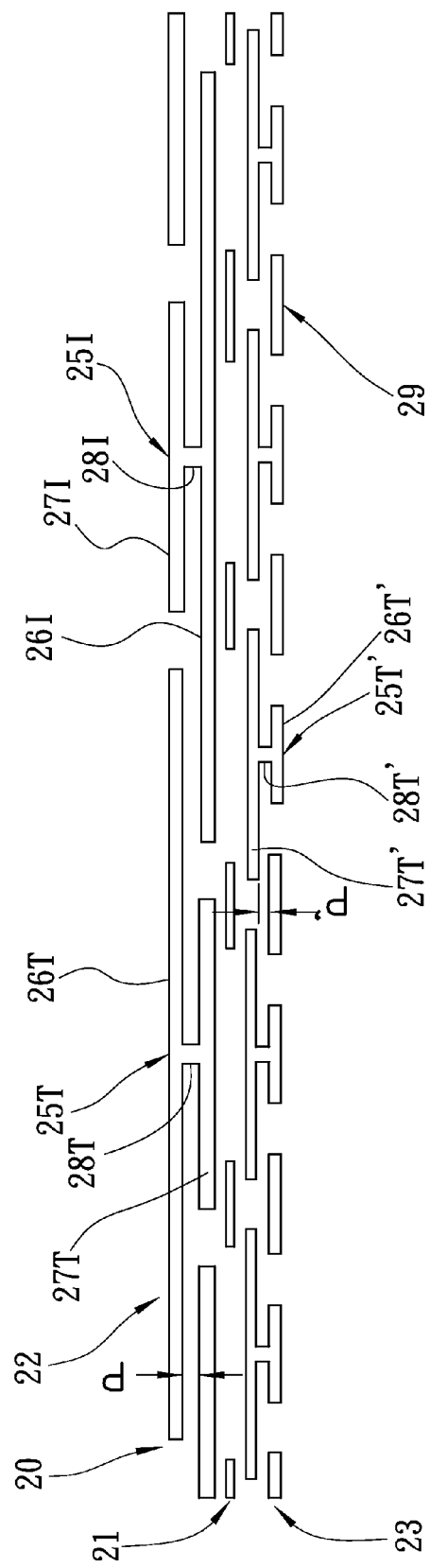
FIG. 5 is a schematic illustration showing another local layout of the electrode loop structure according to the preferred embodiment of the invention.

The features of the invention reside in that the electrode loop (20) is composed of a discontinuous resistor chain (21), a conducting chain (22) formed outside the discontinuous resistor chain (21) and a gradient chain (23) formed inside the discontinuous resistor chain (21). As shown in FIGS. 3 to 5, the electrode loop (20) extends from a plurality of I-shaped electrode elements (25) and a plurality of horizontally linear control elements (29) serving as a base, and utilizes the annular conducting chain (22) and gradient chain (23) regularly cascaded together. The electrode element (25) includes a long section (26), a short section (27) and a middle conducting section (28) connected to the long section (26) and the short section (27).

The conducting chain (22) includes electrode elements (25T, 25I), which are cascaded together and are disposed in forward and reverse manners, respectively, wherein the long sections (26T, 26I) correspondingly overlap with each other, so that the top edges of the long section (26T) and the short section (27I) of the neighboring electrode elements (25T, 25I) are on the same edge line, and the bottom edges of the short section (27T) and the long section (26I) are on the same edge line, wherein the electrode elements (25T, 25I) can change the conductor area to generate the trend of voltage drop by controlling and adjusting the overlapped cascaded length (L) and the relative distance (P) between the long sections (26T, 26I). In addition, a gap (G) between the bottom edge of the conducting chain (22) and the top edge of the gradient chain (23) may be conducted by the property of the electroconductive layer, so that the conducting chain (22) has the voltage regulating and compensating properties.

Also, the gradient chain (23) is composed of the electrode elements (25T') and the separately disposed and serially horizontally linear control elements (29), which are regularly separately cascaded with the serial long sections (26T') being disposed atop. The control element (29) is disposed below the interval between the neighboring two of the electrode elements (25T'). The bottom edges of the control elements (29) and the bottom edges of the short sections (27T') of the electrode elements (25T') are on the same edge line. Also, the electrode elements (25T') of three gradient chains (23) may correspond to the electrode element (25T or 25I) of one conducting chain (22). Furthermore, the electrode elements (25T') can obtain a homogenized electric field effect by controlling and adjusting the length (L') of the long section (26L') thereof and the relative distance (P') between the bottom edge of the long section (26L') and the top edge of the control element (29), so that the gradient chain (23) has the voltage distribution uniformity.

Furthermore, the discontinuous resistor chain (21) is composed of discontinuous insulating portions (210) formed on the electroconductive layer (12) of the electroconductive substrate (10) by way of etching or laser. The lengths of the insulating portions (210) gradually decrease from an edge to a middle, and the gaps between the neighboring insulating portions (210) decrease from the middle to the edge. Each insulating portion (210) corresponds to an interval between the long sections (26L') of the electrode elements (25T') of the gradient chain (23).

The middle gradient chain (23) of the electrode loop (20) on each side corresponds to the middle of the conducting chain (22) on the side, and the middle of the discontinuous resistor chain (21) on each side corresponds to the middle of the conducting chain (22).

Figure 6:
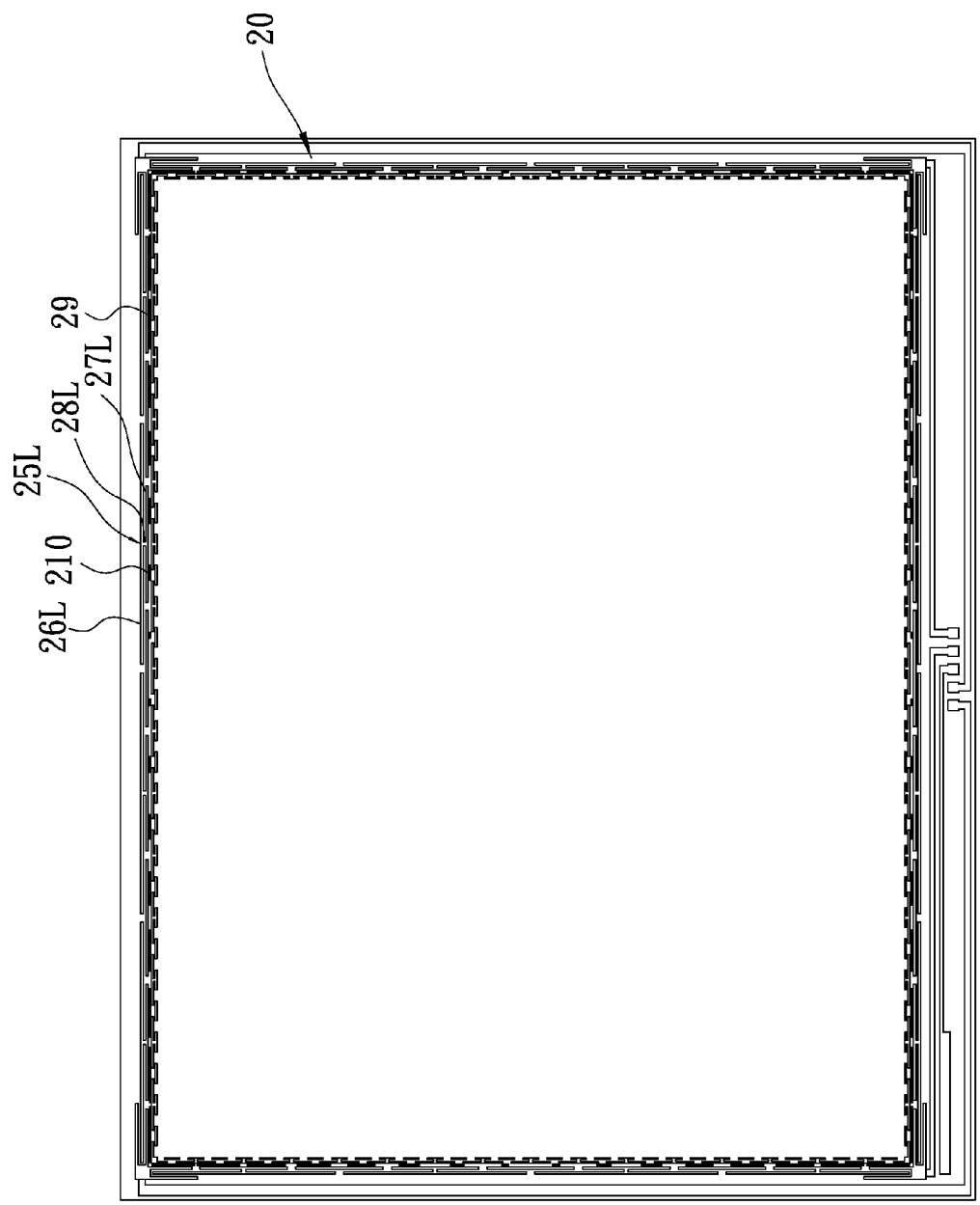
FIG. 6 is a schematic illustration showing a planar layout showing an electrode loop structure of a touch panel according to another preferred embodiment of the invention.
Figure 7:
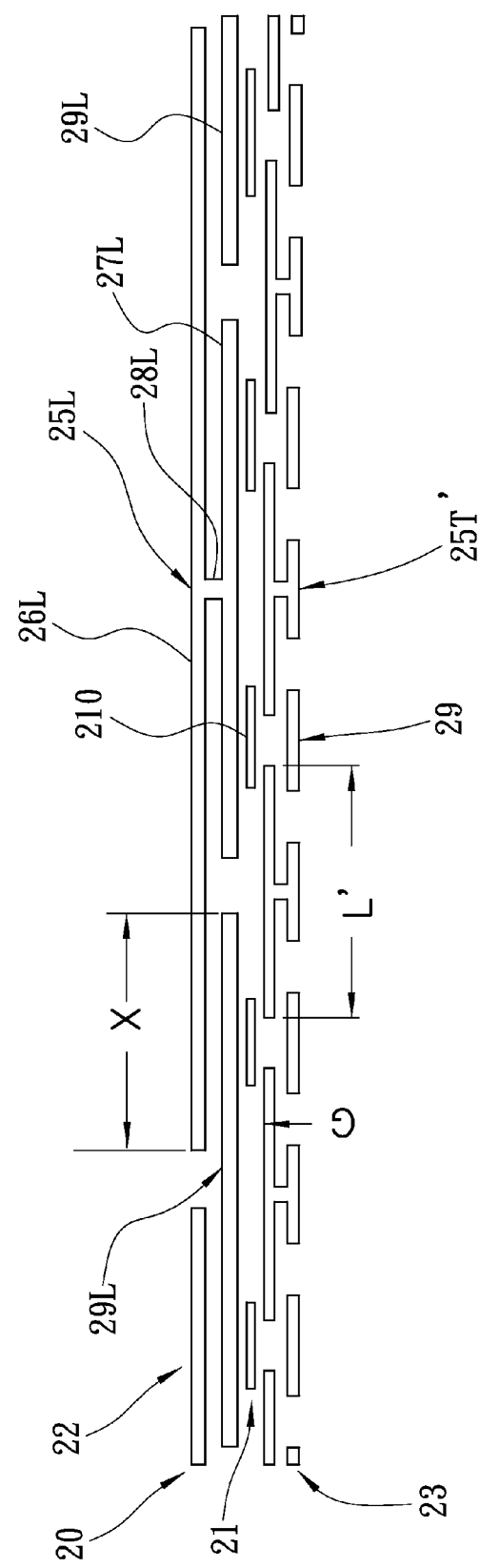
FIG. 7 is a schematic illustration showing a local layout of the electrode loop structure according to another preferred embodiment of the invention.
Figure 8:
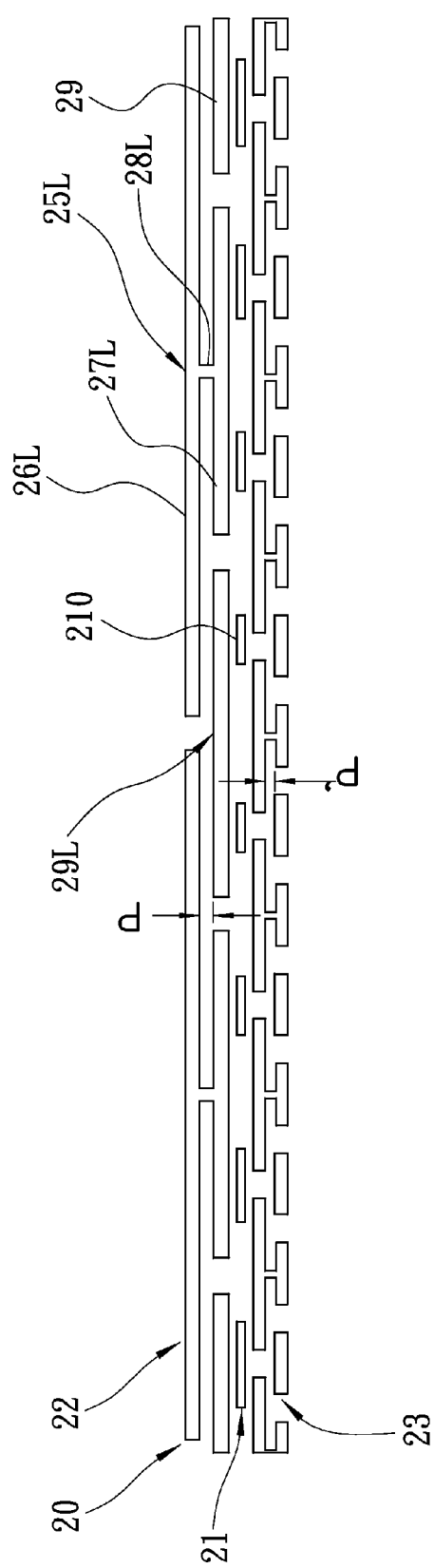
FIG. 8 is a schematic illustration showing another local layout of the electrode loop structure according to another preferred embodiment of the invention.

Also, FIGS. 6 to 8 show another electrode loop (20) according to another preferred embodiment of the invention, wherein the conducting chain (22L) includes electrode elements (25L) and serially and separately disposed horizontally linear control elements (29L) regularly separately cascaded with the serial long sections (26L) being disposed atop, and the control elements (29L) are disposed below the intervals between the neighboring electrode elements (25L). The bottom edges of the control elements (29L) and the bottom edges of the short sections (27L) of the electrode elements (25L) are on the same edge line, wherein the electrode elements (25L) can change the conductor area to generate the trend of voltage drop by controlling and adjusting the overlapped cascaded length (X) and the relative distance (P) between the long section (26L) thereof and the control element (29L). In addition, the gap (G) between the bottom edge of the conducting chain (22) and the top edge of the gradient chain (23) can be conducted by the property of the electroconductive layer, so that the conducting chain (22) has the voltage regulating and compensating properties.

The gradient chain (23) is composed of the electrode elements (25T') and the serially and separately disposed horizontally linear control elements (29) regularly separately cascaded with the serial long sections (26T') being disposed atop, and the control elements (29) are disposed below the intervals between the neighboring electrode elements (25T'). The bottom edges of the control elements (29) and the bottom edges of the short sections (27T') of the electrode elements (25T') are on the same edge line. Also, the electrode elements (25T') of three gradient chains (23) can correspond to the electrode element (25L) of one conducting chain (22L). Similarly, this can also generate the equivalent serial connection of resistors, and satisfy the narrow-edge design requirement.

With the design mentioned hereinabove, the conducting chain (22) of the invention can change the conductor area to generate the trend of voltage drop by controlling and adjusting the cascaded lengths of the electrode elements (25T, 25I) and the gaps between the electrode elements (25T, 25I), so that the conducting chain (22) has the voltage regulating and compensating properties. Meanwhile, the gradient chain (23) may also make the gradient chain (23) have the voltage distributing uniformity by changing the lengths of and the gaps between the elements (25T'). Thus, the electrode loop (20) is effectively distributed around the electroconductive substrate (10) so as to form the homogenized electric field effect. Utilizing the homogenized electric field effect can provide the extremely narrow-edge trace layout space to increase the visible range and enhance the reproducibility and stability of the touch panel, thereby significantly enhancing the product reliability.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:
1. An electrode loop structure of a touch panel, the electrode loop structure comprising:
an electroconductive substrate having an upper surface formed with an electroconductive layer;
an electroconductive film attached to the upper surface of the electroconductive substrate to form an integral structure; and
an electrode loop mounted around the electroconductive layer of the electroconductive substrate, wherein the electrode loop comprises:
a conducting chain comprising a plurality of I-shaped electrode elements regularly cascaded together, wherein each of the electrode elements has a long section, a short section and a middle conducting section connected to the long section and the short section, and neighboring two of the electrode elements are separately disposed in forward and reverse manners, respectively, wherein the long sections of the neighboring electrode elements correspondingly overlap with each other, top edges of the long section and the short section of the neighboring electrode elements are on the same edge line, and bottom edges of the short section and the long section of the neighboring electrode elements are on the same edge line;

a gradient chain extending from a plurality of separately disposed I-shaped electrode elements and serially and separately disposed horizontally linear control elements serving as a base, wherein each of the electrode elements has a long section, a short section and a middle conducting section connected to the long section and the short section, wherein the electrode elements are regularly separately cascaded with the long sections being disposed atop, each of the control elements is disposed below an interval between neighboring two of the electrode elements, and bottom edges of the control elements and bottom edges of the short sections of the electrode elements are on the same edge line; and a discontinuous resistor chain formed by forming discontinuous insulating portions on a surface of the electroconductive layer, wherein the conducting chain and the gradient chain are formed outside and inside the discontinuous resistor chain, respectively, lengths of the insulating portions gradually decrease from an edge to a middle, gaps between the insulating portions gradually increase from the middle to the edge, and each of the insulating portions corresponds to an interval between the long sections of the neighboring electrode elements of the gradient chain.

2. The electrode loop structure according to claim 1, wherein the electrode elements of three of the gradient chains of the electrode loop correspond to one of the electrode elements of the conducting chain.

3. The electrode loop structure according to claim 1, wherein a middle of the gradient chain of the electrode loop on each side corresponds to a middle of the conducting chain on the side, and a middle of the discontinuous resistor chain on each side corresponds to a middle of the conducting chain on the side.

4. An electrode loop structure of a touch panel, the electrode loop structure comprising:

an electroconductive substrate having an upper surface formed with an electroconductive layer;

an electroconductive film attached to the upper surface of the electroconductive substrate to form an integral structure; and an electrode loop mounted around the electroconductive layer of the electroconductive substrate, wherein the electrode loop comprises:

a conducting chain extending from a plurality of separately disposed I-shaped electrode elements and serially and separately disposed horizontally linear control elements as a base, wherein each of the electrode elements comprises a long section, a short section and a middle conducting section connected to the long section and the short section, wherein the electrode elements are regularly separately cascaded with the long sections being disposed atop, each of the control elements is disposed below an interval between neighboring two of the electrode elements, and bottom edges of the control elements and bottom edges of the short sections of the electrode elements are on the same edge line;

a gradient chain extending from a plurality of separately disposed I-shaped electrode elements and serially and separately disposed horizontally linear control elements serving as a base, wherein each of the electrode elements has a long section, a short section and a middle conducting section connected to the long section and the short section, wherein the electrode elements are regularly separately cascaded with the long sections being disposed atop, each of the control elements is disposed below an interval between neighboring two of the electrode elements, and bottom edges of the control elements and bottom edges of the short sections of the electrode elements are on the same edge line; and a discontinuous resistor chain formed by forming discontinuous insulating portions on a surface of the electroconductive layer, wherein the conducting chain and the gradient chain are formed outside and inside the discontinuous resistor chain, respectively, lengths of the insulating portions gradually decrease from an edge to a middle, gaps between the insulating portions gradually increase from the middle to the edge, and each of the insulating portions corresponds to an interval between the long sections of the neighboring electrode elements of the gradient chain.

5. The electrode loop structure according to claim 4, wherein the electrode elements of three of the gradient chains of the electrode loop correspond to one of the electrode elements of the conducting chain.

6. The electrode loop structure according to claim 4, wherein a middle of the gradient chain of the electrode loop on each side corresponds to a middle of the conducting chain on the side, and a middle of the discontinuous resistor chain on each side corresponds to a middle of the conducting chain on the side.

* * * * *